Sept. 24, 1957 P. G. HANSEL 2,807,781
DIRECT-READING FREQUENCY METER
Filed Jan. 8, 1953

INVENTOR
PAUL G. HANSEL
BY Mitchell & Bechert
ATTORNEYS

United States Patent Office 2,807,781
Patented Sept. 24, 1957

2,807,781

DIRECT-READING FREQUENCY METER

Paul G. Hansel, Greenvale, N. Y., assignor to Servo Corporation of America, New Hyde Park, N. Y., a corporation of New York Application January 8, 1953, Serial No. 330,295

21 Claims. (Cl. 324—78)

My invention relates to frequency-generating or synthesizing methods and means.

It is an object of the invention to provide an improved method and means of the character indicated.

Another object is to provide improved frequency-analyzing means.

A further object is to provide improved means for generating a spectrum of known frequencies.

A specific object is to provide relatively simple means for the generation of a particular frequency from a known or reference frequency, said particular frequency being at any selected point over a relatively large spectrum and always ascertainable with an accuracy equalling that of the reference frequency.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Figure 1:
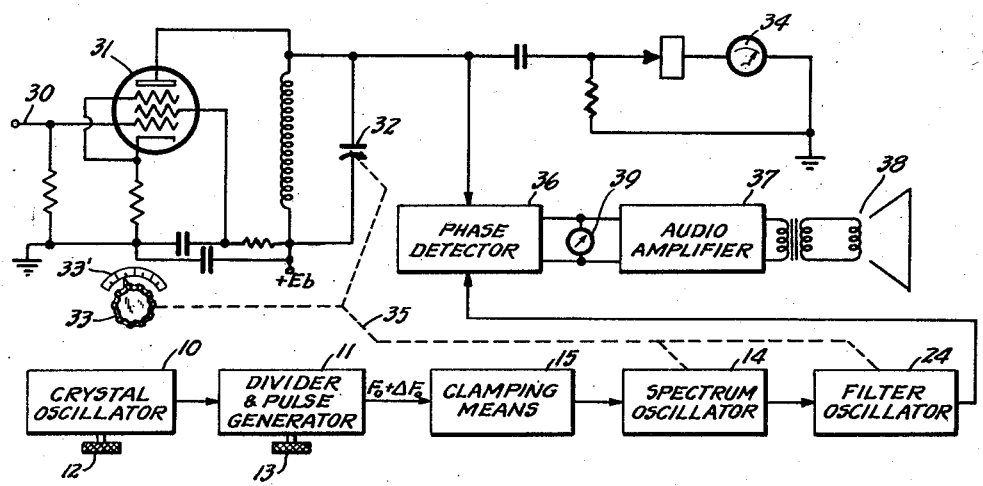
Fig. 1 is a simplified circuit diagram illustrating components and systems incorporating features of the invention.

Briefly stated, my invention contemplates the employment of a free-running oscillator having a frequency response including the desired frequency or frequencies to be generated, and clamping or short-circuiting means for quenching the oscillator intermittently and at a repetition rate that is an exact submultiple of the desired frequency (or, in the case of spectrum generation, of each of the frequencies desired). For spectrum-generating purposes the proportion of on-to-off time for the operation of the clamping or short-circuiting means may be relatively small, and the free-running oscillator may be, in effect, a broad-band amplifier responsive over the full spread of frequencies in the desired spectrum; the desired spectrum may thus be only a selected part of the total spectrum developed from harmonics of the short-circuiting frequency. For generation of a single frequency, the proportion of on-to-off time for the clamping or short-circuiting means is preferably relatively large, and when a strong pure single-frequency output is desired, filtering means may be added in the output of the free-running oscillator; in the form to be disclosed, I include a second free-running oscillator as the filtering means, and both free-running oscillators may be tuned in synchronism, as through a ganged connection.

The basic signal-generating means thus provided may be employed in a variety of applications including the selective control of a radio-frequency transmitter to any one of a wide variety of transmitting frequencies, in generally the manner set forth in my copending application, Serial No. 238,257, filed July 24, 1951; alternatively, as when the basic short-circuiting rate is determined by a crystal oscillator of known calibration, my signal-generating means may serve as a secondary standard for any one of the frequencies available within its range of operation. In the form specifically described in the present case, I illustrate application of my signal-generating means to a frequency-analyzing device in which, with two manual operations simply made in the interval of a few seconds, I may identify an unknown frequency anywhere within a relatively enormous spectrum.

The operation of my device relies principally upon the so-called Golicke method of frequency multiplication, which holds that any wave shape can be represented by a Fourier series if, and only if, it is a time function which recurs in a definite periodic manner. Golicke's suggestion was to start with a pulse having a repetition frequency equal to the desired spectrum interval and then to use this pulse to key on and off a train of higher frequency sine waves. If the oscillations are completely damped out between pulses and start always with the same phase, the resulting train of interrupted sine waves is found to contain only frequencies which are integral multiples of the pulse-repetition frequency. If the "off" period of the oscillator is very small compared to the "on" period, the output spectrum is narrow and approaches a mono-line spectrum as the "off" period approaches zero, and a large ratio of "off" time to "on" time results in a relatively wide spectrum.

Referring to Fig. 1 of the drawings, I illustrate application of the principles of my invention to a frequency-analyzing device employing the teachings of Golicke in circuits identified generally as a crystal oscillator 10, and as a divider and pulse generator 11. The oscillator 10 will be understood to be a controlled oscillator which may serve as a secondary standard for the oscillating frequency thereof, and for purposes which will later appear, the oscillator 10 may include means 12 for adjustably varying the frequency thereof over a desired relatively small spread of frequencies. The divider and pulse generator 11 may provide a pulsed output of repetition rate representing a known sub-division of the basic crystal-oscillator frequency, and variable means 13 may be provided to control the time-sharing or duty cycle characterizing the on-off operation for the pulsed output. The output of means 11 may thus comprise a succession of relatively brief pulses of repetition rate, $F_0 + \Delta F_0$, where $F_0$ represents the subdivision of the basic crystal frequency, and $\Delta F_0$ represents the frequency increment attributable to adjustment at 12.

Figure 2:
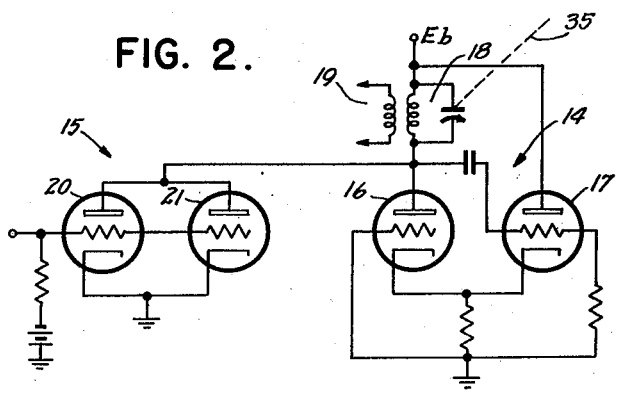
Fig. 2 is a fragmentary circuit diagram illustrating parts of the circuit of Fig. 1 and particularly applicable for frequency-spectrum generation.

In accordance with the invention, I provide a free-running oscillator 14 tunable over a range of frequencies which are harmonics of the basic frequency $F_0$ so as to respond to a particular one or more of such harmonics. The oscillator 14 may be excited by these harmonic frequencies upon clamping or short-circuiting the oscillator 14, as suggested by the block 15. In Fig. 2, I illustrate a specific manner of accomplishing this function.

In Fig. 2, the free-running oscillator 14 happens to be a two-stage oscillator having triode sections 16—17 for each stage. A tunable tank circuit 18 is included in the feed-back loop, and oscillator output is available at 19 by inductive coupling with the tank circuit 18. The oscillator is shown to be excited by the pulses from generator 11 by short-circuiting one of the two oscillator stages, such as the stage including the triode 16, and I employ vacuum-tube means for effecting the short circuit. In order to reduce the time constant of the short-circuiting elements, I show two vacuum-tube sections 20—21 in parallel, for grounding the plate of oscillator tube 16 whenever an incoming pulse from generator 11 renders the tubes 20—21 conductive. The nature of the generator 13 and clamping means 15 will be understood to be such that short-circuiting impulses are always applied to the clamping circuit 15 long enough to completely extinguish oscillations in oscillator 14, and that all such impulses are applied in the same phase relation with respect to oscillations at the fundamental frequency $F_0 + \Delta F_0$.

If the ratio of on-to-off short-circuiting time is relatively small, that is, if the duty cycle for the pulse output at 11 is relatively small, then the spectrum available from pulse generation and, therefore, for excitation of oscillator 16—17 will be relatively rich in harmonics; and oscillator 16—17, as governed by tank circuit 18, will, in effect, select and amplify only a portion of such spectrum, depending upon the tank-circuit characteristics. If the tank circuit is highly selective, then essentially only one or two harmonics will characterize the response of the oscillator 16—17, depending upon the tuned relation of tank circuit 18 with respect to one or two particular adjacent harmonics in the spectrum.

Figure 3:
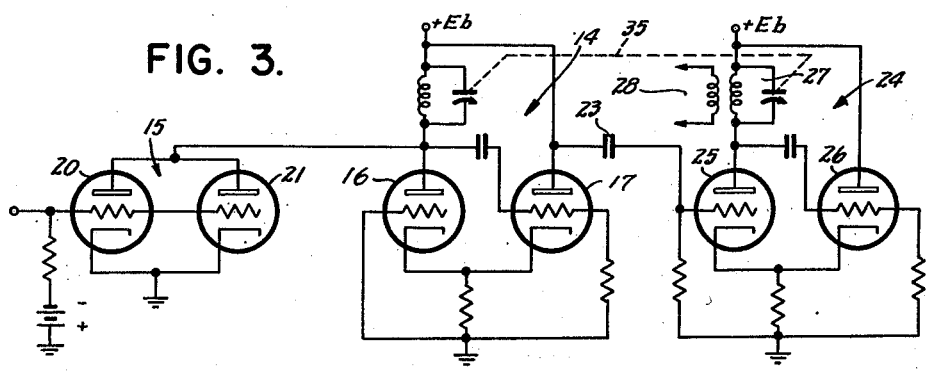
Fig. 3 is a diagram similar to Fig. 2, but illustrating connections particularly applicable to the generation of essentially single frequencies.

For many applications, the selectivity afforded by the single oscillator 16—17 may be quite adequate, but for frequency-analyzing purposes, I prefer to provide means for improving the signal-to-noise ratio in the oscillator output so that a single harmonic frequency may be amplified essentially tot he exclusion of all other harmonic frequencies, thus providing a so-called mono-line spectrum output. In Fig. 3, I illustrate simplified means for accomplishing this result.

In Fig. 3, the clamping means 15 will be recognized, as also will be the spectrum oscillator 14. However, through a capacitative coupling 23 to the output of oscillator 14, I have connected filtering means 24 in the form of a second free-running oscillator, which may be a substantial duplicate of the first free-running oscillator 14. The filter oscillator 24 may thus comprise two stages 25—26 and a tank circuit 27, with means 28 coupled to the tank circuit for extracting an output frequency. In practice, I have found that the filter oscillator 24 produces a filtering action so great that the unwanted sideband signals are attenuated to amplitudes 60 to 70 db below the desired harmonic, so that the output of the filter oscillator at 28 may be considered substantially a mono-line spectrum when tuned to a particular harmonic of the reference frequency $F_0$.

As indicated generally above, the basic frequency-generating means may have a variety of applications including the provision of secondary-standard reference frequencies, the automatic control of radio-transmission frequencies, and the like. However, I have here shown direct application to a frequency-analyzing instrument, accepting an unknown frequency at an input 30 to a free-running oscillator 31; oscillator 31 may include an adjustably tunable element 32, whereby, as by actuation of a control knob 33, the input signal may be identified as to frequency by noting on an output meter 34 the peak of tuned response to the input signal. The oscillator 31 may be calibrated, as by provided graduations 33'' against which an indicator for knob 33 may be read, but for frequency-analyzing purposes, such readings may be inadequate. These readings may, however, be of an accuracy sufficient to identify one harmonic as distinguished from any other harmonic in the spectrum potentially available from the action of the pulse generator 11. Therefore, for convenience, I show means 35 ganging the tuning operation of oscillator 31 with that of spectrum oscillator 14 and (if employed) with that of filter oscillator 24. The combined action of ganging the tuning of oscillators 14—24—31 will be to assure that for a particular setting of the means 12, the oscillator output at 19 (or at 28, if used) will include the frequency of the oscillator 31.

Now, for a particular setting of the means 12, such output (at 19, or at 28, as the case may be) may produce one or more predominant frequency components representing one or more harmonics (of the reference frequency $F_0$) in the tuned spectrum, but if the means 12 is adjustably varied, then a particular one of these harmonics may be assuredly selected and caused to dominate the output of oscillator 14, or 24, as the case may be.

In order to evaluate whether such selected dominant frequency component coincides with the input-signal frequency, I employ differentially responsive means such as a phase detector 36, which may respond directly to the output of spectrum oscillator 14 and to the output of input oscillator 31, but which, in the form shown in Fig. 1, responds to the output of filter oscillator 24 and to the output of input oscillator 31. If the difference frequency available from the phase detector happens to be an audio frequency, then such effect may be detected by audio-amplifier means 37 feeding the difference frequency to audio-presentation means, such as the loud speaker 38; this effect will be immediately apparent to the ears upon adjustment at 12 and will be understood to be indicative of audible difference frequencies. For sub-audible difference frequencies, that is, for finer adjustment of the means 12, a zero-beat detector 39 may present a visual display, and if the oscillator 31 is sufficiently stable with respect to the crystal oscillator 10, then upon proper adjustment of the means 12 a setting can be found for which the visual-indicating means 39 will stand virtually still, representing exact frequency coincidence between the input signal frequency, as tuned at 32, and the secondary-standard frequency, as available at 28.

It will be seen that I have described a basically simple circuit arrangement for selectively generating one or more frequencies which are identifiable within a relatively wide spectrum and with a precision matching that of the basic frequency source from which the equipment operates. The basic signal generator is applicable to the control of exciters for conventional radio transmitters, and as a reference frequency generator for frequency meters of the type disclosed in my copending application, Serial No. 200,060, filed December 9, 1950, now Patent No. 2,749,515. In application to a frequency-analyzing device of the type presently described, my arrangement provides extreme convenience in use and a rapid approach to the precise analysis of an unknown frequency in a relatively wide range.

While I have described the invention in detail for the preferred forms shown, it will be understood that modifications may be made within the scope of the invention as defined in the claims which follow.

I claim:

1. Electric signal-generating means, comprising a free-running oscillator having a tuned frequency response including a desired frequency component, precisely controllable short-circuiting means for controllably short-circuiting said oscillator, and means controlling the on-off operation of said short-circuiting means at a repetition rate that is an exact submultiple of the desired frequency component.

2. Electric signal-generating means, comprising a free-running oscillator having an oscillation response including a desired frequency component, filtering means responsive to the output of said oscillator and having a frequency response including said component, controllable short-circuiting means for controllably short-circuiting said oscillator, and means controlling the on-off operation of said short-circuiting means at a repetition rate that is an exact submultiple of the desired component.

3. Signal-generating means according to claim 2, in which both said oscillator and said filtering means incorporate variable tuning means, and means synchronizing the variable tuning of said oscillator and of said filtering means.

4. Electric signal-generating means, comprising a free-running oscillator having a frequency response including a desired frequency component, precisely controllable short-circuiting means including vacuum-tube means having an input circuit, the output circuit of said vacuum-tube means being connected in potential short-circuiting relation with said oscillator, and means connected to said input circuit and controlling the on-off operation of said vacuum-tube means at a repetition rate that is an exact submultiple of the desired frequency component.

5. Electric signal-generating means, comprising a free-running oscillator having a frequency response including a desired frequency component, controllable short-circuiting means in potential short-circuiting relation with said oscillator, and means including a crystal-controlled oscillator for controlling the on-off operation of said short-circuiting means at a repetition rate that is an exact submultiple of the desired frequency component.

6. Signal-generating means according to claim 5, in which said crystal-controlled oscillator includes a frequency divider for deriving a selected submultiple of the frequency of the crystal-controlled oscillator, whereby the fundamental frequency for determining the harmonic which constitutes the desired frequency component may be relatively low, so that the desired frequency component may, if necessary, be less than the basic oscillating frequency before frequency-division.

7. Signal-generating means according to claim 5, in which said crystal-controlled oscillator includes variable tuning means, whereby the harmonic which is to constitute the desired frequency component may be shifted in frequency by amounts less than the frequency increment between harmonic components adjacent said desired frequency component.

8. In a frequency-analyzing device of the character indicated, a free-running oscillator responsive to an unknown input-signal frequency and including variable tuning means for varying the oscillating frequency until it substantially exactly coincides with the input-signal frequency, signal-generating means including a second free-running oscillator having a frequency response including the frequency of said input signal, controllable short-circuiting means in potential short-circuiting relation with said second oscillator, means controlling the on-off operation of said short-circuiting means at a repetition rate that is substantially a submultiple of the input signal frequency, said last-defined means including a controlled oscillator and means for varying the tuning thereof, whereby the harmonic to which said second oscillator responds may be adjustably displaced in frequency in the region of the frequency of said input signal, and means differentially responsive to the output frequencies of said free-running oscillators, whereby upon varying said controlled oscillator one may identify the frequency of the unknown input signal by noting the harmonic for which frequency coincidence is detected by said differentially responsive means.

9. A frequency-analyzing device according to claim 8, in which said differentially responsive means includes a phase detector responsive to the instantaneous phase difference between the respective output frequencies of both said free-running oscillators, whereby the output of said phase detector may be indicative of frequency coincidence or of a lack of such coincidence between said output frequencies.

10. A frequency-analyzing device according to claim 8, in which said differentially responsive means includes zero-beat detector means responsive to the instantaneous phase difference between the respective output frequencies of both said free-running oscillators.

11. A frequency-analyzing device according to claim 8, in which said differentially responsive means includes visual presentation means for visually displaying the frequency difference, if any, between the respective outputs of said free-running oscillators.

12. A frequency-analyzing device according to claim 8, in which said differentially responsive means includes audio-frequency presentation means for audibly presenting the frequency difference, if any, between the respective outputs of said free-running oscillators.

13. Electric signal-generating means, comprising a two-stage free-running oscillator having a frequency response including a desired frequency component, vacuum-tube means connected in potential short-circuiting relation with one stage of said oscillator when said vacuum-tube means is conductive, and means including a controlled oscillator controlling the on-off operation of said vacuum-tube means at a repetition rate that is an exact submultiple of the desired frequency component.

14. Signal-generating means according to claim 13, and including a second two-stage oscillator tuned substantially to the desired frequency component and connected to the output of said first oscillator, whereby a filtering action more sharply selective of the desired frequency component is available.

15. In a frequency-analyzing device of the character indicated, a first free-running oscillator responsive to an unknown input-signal frequency and including variable tuning means for varying the oscillating frequency thereof into exact coincidence with the input signal frequency, signal-generator means including a second free-running oscillator having a tuning element ganged to the variable tuning means of said first free-running oscillator, whereby the frequency response of said second oscillator may include a frequency component substantially at the frequency of the unknown frequency, means including a controlled oscillator and a controllable short-circuiting element connected to said second free-running oscillator for short-circuiting said second free-running oscillator at a repetition rate representing substantially a submultiple of the unknown frequency, whereby said second oscillator will respond to a harmonic near the unknown frequency, said controlled oscillator including variable tuning means, whereby said harmonic may be shifted in frequency by a controlled amount sufficient to produce coincidence with the unknown frequency, and means including a phase detector responsive to the outputs of both free-running oscillators for detecting the relative phase of said free-running oscillators at frequency coincidence.

16. A frequency analyzing device according to claim 15, and including a third free-running oscillator having variable tuning means ganged with the tuning means of said first and second free-running oscillators, said third free-running oscillator being connected between said second free-running oscillator and said phase detector, whereby the signal-to-noise ratio identifying a particular harmonic component generated by said second free-running oscillator may be improved for supply to said phase-detector means.

17. Spectrum-generating means for generating from a reference frequency a plurality of frequency components bearing a harmonic relation to the reference frequency, comprising a crystal-controlled oscillator including means for subdividing the basic frequency thereof to a desired fundamental frequency, a free-running oscillator, and short-circuiting means for periodically quenching said free-running oscillator and operating at an on-off rate governed by the output of said dividing means and, therefore, by said fundamental frequency.

18. Spectrum-generating means according to claim 17, in which said frequency-dividing means includes pulse-shaping means including means for varying the duty cycle of output pulses, whereby the width of the harmonic spectrum generated in said free-running oscillator may be controlled.

19. Spectrum- generating means according to claim 17, in which said crystal-controlled oscillator includes variable tuning means, whereby the placement of harmonic components in said spectrum may be adjustably varied.

20. Electric signal-generating means, comprising a free-running oscillator having a frequency response including a desired frequency component, short-circuiting means for said oscillator, and means controlling the on-off operation of said short-circuiting means at a repetition rate that is an exact submultiple of the desired frequency component, said oscillator including variable tuning means, whereby for the same repetition rate for short-circuiting said oscillator, particular desired harmonic-frequency components may be available from the same oscillator.

21. Electric signal-generating means, comprising a free-running oscillator having a frequency response including a desired frequency component, short-circuiting means including vacuum-tube means comprising two triodes in parallel and having an input circuit, the output circuit of said triodes being connected in potential short-circuiting relation with said oscillator, and means connected to said input circuit and controlling the on-off operation of said vacuum-tube means at a repetition rate that is an exact submultiple of the desired frequency component.

References Cited in the file of this patent
UNITED STATES PATENTS

| | | |
|---|---|---|
| 2,402,385 | Eaton | June 18, 1946 |
| 2,440,264 | Grieg | Apr. 27, 1948 |
| 2,456,016 | Owen | Dec. 14, 1948 |
| 2,561,172 | Bischoff | July 17, 1951 |
| 2,617,034 | Hepp | Nov. 4, 1952 |
| 2,638,548 | MacNichol | May 12, 1953 |

OTHER REFERENCES

Publication: Radio Amateurs Handbook, 1946, page 396, published by A. R. R. League.